(12) United States Patent
Harder

(10) Patent No.: US 6,549,769 B1
(45) Date of Patent: Apr. 15, 2003

(54) SYSTEM AND METHOD FOR INTEGRATING TEXT MESSAGING TO AN OUTBOUND CALL SYSTEM

(75) Inventor: Glenn Harder, Nashua, NH (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/429,822

(22) Filed: Oct. 29, 1999

(51) Int. Cl.[7] .................. H04M 3/00; H04Q 7/20; G06E 15/16
(52) U.S. Cl. .................. 455/418; 455/426; 709/218
(58) Field of Search .................. 455/466, 426, 455/418; 709/218

(56) References Cited

U.S. PATENT DOCUMENTS

| | | | |
|---|---|---|---|
| 5,327,480 A | * 7/1994 | Breeden | |
| 5,392,452 A | * 2/1995 | Davis | |
| 5,541,976 A | * 7/1996 | Ghisler | |
| 5,694,453 A | * 12/1997 | Fuller et al. | |
| 5,797,094 A | 8/1998 | Houde et al. | 455/412 |
| 5,841,854 A | 11/1998 | Schumacher et al. | 379/265 |
| 5,920,826 A | 7/1999 | Metso et al. | 455/557 |
| 5,940,756 A | * 8/1999 | Sibecas et al. | 455/426 |
| 5,943,399 A | 8/1999 | Bannister et al. | 379/88.17 |
| 6,173,316 B1 | * 1/2002 | Deboor et al. | 709/218 |
| 6,263,202 B1 | * 7/2002 | Kato et al. | 455/418 |

OTHER PUBLICATIONS

Newton, "Newton's Telecom Dictionary" 8th Edition, 1994, p. 182.*

* cited by examiner

Primary Examiner—William Cumming
(74) Attorney, Agent, or Firm—Bourque & Associates, P.A.

(57) ABSTRACT

A system and method of integrating outbound text messaging capabilities to a telephone call center management system, wherein outbound text messages are a secondary means by which a customer can be contacted, the primary means being voice communications between a call center agent and the customer. The system includes a telephone call management system including a dialer for dialing a plurality of contact telephone numbers included in said at least one call record in a call list. Each call record includes a primary customer contact identifier, such as a voice line telephone number and at least one text message destination identifier, which is included as a secondary customer contact identifier. The system also includes a text message processing system, including text message memory for accepting and storing at least one text message for transmission to a text message receiving device and for transmitting the text message upon connection to the text message receiving device.

4 Claims, 4 Drawing Sheets

SYSTEM AND METHOD FOR INTEGRATING TEXT MESSAGING TO AN OUTBOUND CALL SYSTEM

FIELD OF THE INVENTION

The present invention concerns computer telephony systems and in particular, provides a system and method of adding text messaging capabilities to an outbound call system.

BACKGROUND OF THE INVENTION

Telephony call centers which place outbound calls and receive inbound calls typically utilize a telephone call center management system to help automate much of the process. Agents with headsets and terminals converse with calling and called parties, while automatic phone dialers dial phone numbers and route connected calls to the agents. The telephone call center management system controls, among other functions, the dialing of outbound telephone numbers from a predefined, sorted customer call list having a number of customer call records within each customer call list.

These customer call lists are usually downloaded from a call record source, such as a host computer, to the telephony call center management system once during a twenty-four hour period, often during the non-busy early hours of the morning. Individual records from the customer call list[s] are then grouped and processed during the day as call campaigns. A call campaign comprises a collection or group customer call records generally having one or more common attributes. A telephony call center can generally run several call campaigns simultaneously.

A typical use of a telephony call center is to initiate an outbound call campaign to contact a predefined group or segment of customers or potential customers that have a common attribute. For example, a call campaign may be directed at contacting persons having credit card accounts with payments overdue by 60 days. The user can instruct a record source, such as a host computer containing a credit card account database, to sort through that database and select the overdue credit card accounts. The host computer then downloads the overdue credit card account records as one or more call lists to the telephone call center management system. This is often referred to as batch processing.

The telephone call center management system then processes the call list as a call campaign by automatically dialing customer credit card account telephone numbers included within the call record, and connecting answered calls to agents. The agents can then converse with the called parties and attempt to reconcile the overdue accounts. Agents record the results of the reconciliation attempt on agent terminals. At the end of the day, the customer call list with the results of the phone calls are uploaded back to the host computer database for storage and future reference.

Each call record may have more than one contact telephone number. When multiple contact telephone numbers are included in a call record, they are prioritized. In other words, there is a primary contact number and one or more secondary contact numbers. Thus, if the telephone call center management system cannot establish voice communications with a called party at the primary contact number, then the system will record the fact that the primary contact number attempt was unsuccessful and either immediately or at some point in the future initiate one or more subsequent attempts by dialing the secondary contact telephone number(s). The process of attempting to establish voice communications by sequentially dialing the primary and secondary contact telephone numbers included in a call record may be performed one or more times during a call campaign. If voice communications cannot be established, then the telephone call center management system records a no contact event.

However, since the primary goal of a telephone call center is to make as many customer contacts as possible, no contact events are not desirable. Accordingly, systems and methods have been developed to attempt to convert what would otherwise be classified as no contact events into positive customer contacts. One such system is the DAVOX UNISON® call center management system, manufactured by the Davox Corporation of Westford, Mass., which incorporates an automated voice messaging system.

When the UNISON® system detects that an outbound call is answered by a voice mail system or an answering machine, the system automatically plays a pre-recorded message over the voice connection, which is recorded by the answering machine or voice mail system. In this manner, a call that is connected to a device that is capable of receiving a voice message can result in the delivery of a message without requiring the call to be routed to a live, call center agent. Thus, messages can be left without requiring any action on the part of a call center agent. This results in greater productivity of a call center since call center agents will only be connected to live connected parties.

However, there are times when a voice mail or answering machine is not available or when a customer has indicated that he or she would prefer to receive a message other than a voice message. Accordingly, it would be advantageous to provide a system and method of integrating text messaging to an outbound call campaign to account for those situations where a voice mail or answering machine is not available or where a preferred secondary contact number is not a voice contact number but is rather a number that connects the call to a device capable of receiving text messages such as a computer or facsimile machine, e-mail address, pager, or the like.

SUMMARY OF THE INVENTION

The disclosed invention provides a system and method of integrating outbound text messaging capabilities to a telephone call center management system. The outbound text messages are a secondary means by which a customer can be contacted, the primary means being voice communications between a call center agent and the customer.

The system includes a telephone call management system including a dialer for dialing a plurality of contact telephone numbers included in at least one call record in a call list. Each call record includes a primary customer contact identifier, such as a voice line telephone number and at least one text message destination identifier, which is included as a secondary customer contact address. The text message destination identifier may be a telephone number for accessing a text message receiving device or it may be an e-mail address where a text message may be sent.

The system also includes a text message processing system including text message memory for accepting and storing at least one text message for transmission to a text message receiving device and for transmitting the text message upon connection to the text message receiving device.

The invention also provides a method of integrating text messaging capabilities to an outbound call campaign, which includes the following steps. First, a text message destination identifier associated with a text message receiving device is included in a call record associated with a customer as a secondary customer contact address. The call record also includes a primary contact telephone number, which is preferably a land line or wireless voice telephone number. A call list including a plurality of call records including the primary contact telephone numbers and the text message destination identifier is provided to a telephone call management system including a dialer.

The method further includes the step of storing at least one text message in a text message processing system. The telephone call center management first attempts to establish voice communications with at least one customer by dialing the primary contact telephone number associated with said customer. If voice communications cannot be established with the customer the telephone call center management system attempts to contact the customer using the text message destination identifier. In one embodiment, the text message identifier comprises a telephone number of a communications device capable of receiving text messages, such as a fax machine, a GSM compatible mobile telephone utilizing the short message service (SMS) standard for text messages, a pager or similar device. When communications are established between the telephone call center management system and the text message receiving device, then, at least one stored text message is transmitted to the text message receiving device.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
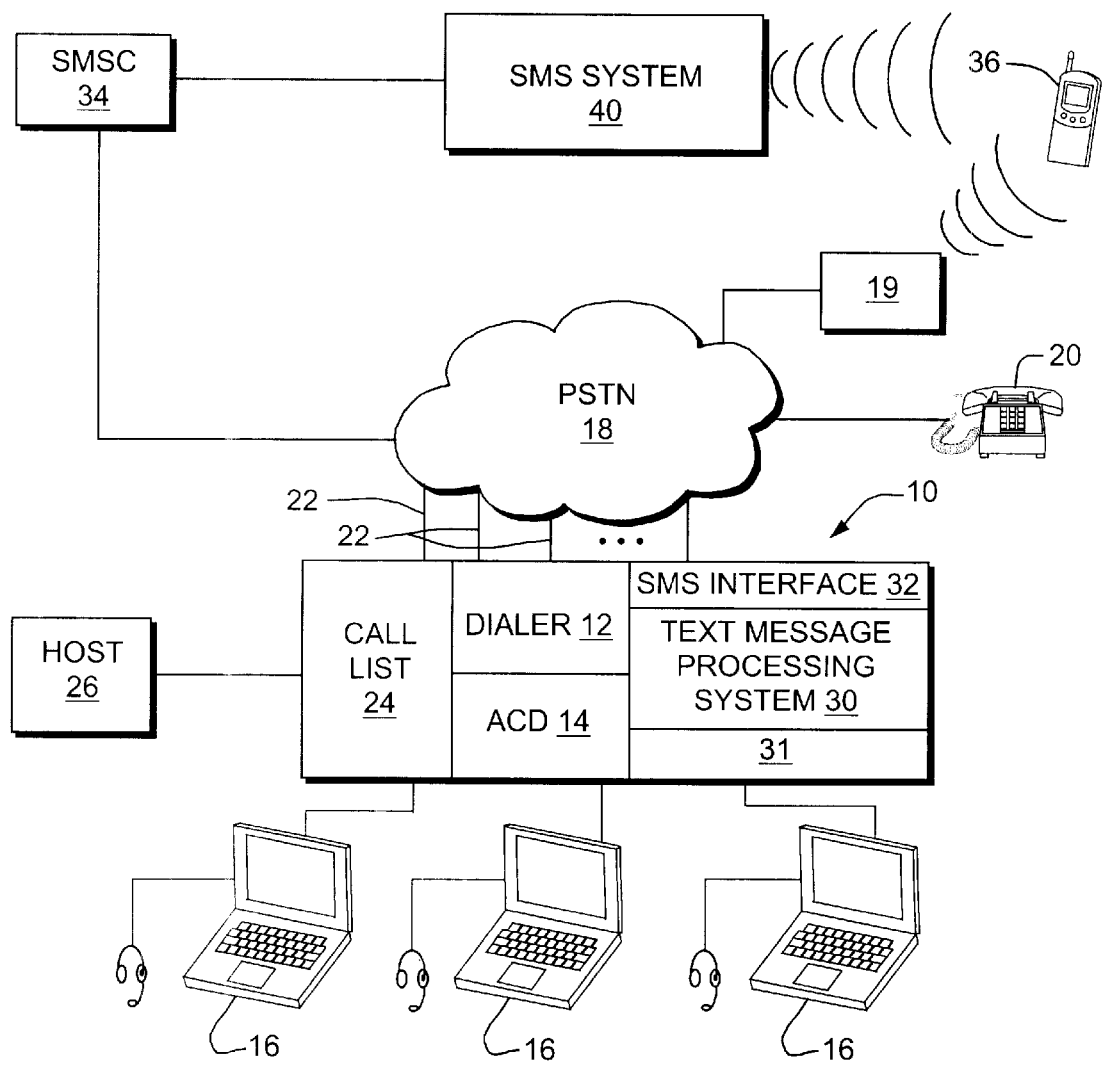
FIG. 1 is a block diagram of one embodiment of a system for integrating outbound text messaging capabilities to a telephone call center management system according to the present invention wherein the text message is a GSM compliant text message transmitted to a mobile telephone or similar device via a Short Message Service Center.

Turning now to the figures, FIG. 1 is a block schematic diagram of the diagram showing one embodiment of a system for integrating outbound text messaging capabilities to a telephone call center management system according to the present invention. This embodiment is compatible with wireless telecommunications technologies, such as the Global Standard for Mobile Communications (GSM), which offer a Short Message Service (SMS) SMS enables a caller to deliver a short text message to a mobile terminal such as a mobile telephone or pager for display at the mobile terminal. As will be discussed in further detail below, callers wishing to send short messages to mobile terminals may use work stations running software applications specifically designed to interact with the SMS.

The system includes a telephone call center management system 10, which includes a dialer 12, and an automatic call distributor (ACD) 14. The telephone call center management system 10 is designed to allow one or more of a plurality of call center agents utilizing call center agent terminals 16 to interface with customers, such as customer 20 over the public switched telephone network (PSTN) 18. The telephone call center management system 10 interfaces the PSTN 18 using a plurality of trunk lines 22.

During the duration of an outbound call campaign, the call center telephone management system 10 typically downloads a call list 24 from a host 26, which includes a plurality of call records. For example, as indicated earlier, an outbound call campaign may be targeted to reach credit card holders having accounts over 60 days past due. In this situation, the call list downloaded from host 26 to the telephone call center management system 10 would include call records associated with those customers.

Typically, the telephone call center management system 10 and, in particular, dialer 12 would attempt to contact those customers having call records included in call list 24 by establishing voice communications over the PSTN 18. As is well known in the art, telephone call center management systems typically include automated call progress detection sub-systems, which detect telephone calls that are answered by a live person and distinguish these calls from those answered by answering machines, voice mail systems and the like.

Upon a live connection to a customer 20, the call center management system 10 connects customer 20 with one or more call center agents 16 to handle the call. Typically, the call center agent 16 handles the call using a script, which is provided to him or her at his or her terminal 16 from call center management system 10 as is well known in the art. Thus, the call center agent can efficiently handle the particular call connected to him or her.

However, in the event that a live person is not available to answer a call placed by the dialer 12 pursuant to a call campaign, then the overall effectiveness of the call campaign is degraded. According to the present invention, the call center management system 10 can improve its effectiveness by providing text messages to those customers having a text message receiving capability.

In the embodiment of FIG. 1, the call center management system 10 includes a text message processing system 30, which is compatible with GSM wireless telecommunications technologies, which offer an SMS. In operation, the text message processing system 30 is utilized to send a short text message to a GSM telecommunications device having text message receiving capabilities. According to the present invention, the telephone call center management system 10 first attempts to contact a customer 20 using voice communications over the PSTN 18. Voice communications may be over a land line or via cellular, wireless communications or the like via a wireless communications provider 19.

The dialer 12 sequentially dials telephone numbers included in call records included in call list 24. As indicated earlier, the primary means of communicating with a customer is via voice communications. Accordingly, each call record includes a primary contact telephone number, which is the first number dialed by dialer 12 associated with a call record. If voice communications are unable to be established using the primary contact telephone number, the dialer may attempt to establish communications by dialing one or more secondary contact telephone numbers included in the call record. These secondary contact telephone numbers may include alternate voice lines, such as a customer's business telephone or mobile telephone number. In addition, at least one secondary contact telephone number comprises a text message destination identifier, such as a telephone number, pager number, facsimile number or e-mail address associated with a text message receiving device.

In the embodiment shown, the text message receiving device is a GSM compatible mobile telephone 36, to which a short text message is transmitted from the text message processing system 30. Since the goal of the call center is to establish as many positive communication events as possible, text message transmission is preferably accomplished automatically, without the need for operator interaction. For example, if a call campaign is directed towards contacting customers having overdue credit card accounts, then a sample text message may read "Please contact us at (800)123-4567 regarding your account." This text message would be generated by a system supervisor and stored in text message memory 31 included in the text message processing system 30.

Thus, when the dialer 12 included in the telephone call center management system 10 dials a secondary contact telephone number associated with a text message receiving device, then the call center management system 10 will instruct the text message processing system 30 to transmit the text message at the appropriate time.

According to this embodiment of the invention, the text message processing system 30 includes a Short Message Service (SMS) interface 32 for converting the text message into a SMS compatible message and for forwarding the same to a Short Message Service Center (SMSC) 34 over the PSTN 18. Once received by the SMSC 34, the SMS compatible text message is then relayed to a mobile station 36 over an SMS system 40. In this manner, the mobile station 36 would be capable of receiving an SMS compatible text message thereby providing positive contact with the customer.

Figure 2:
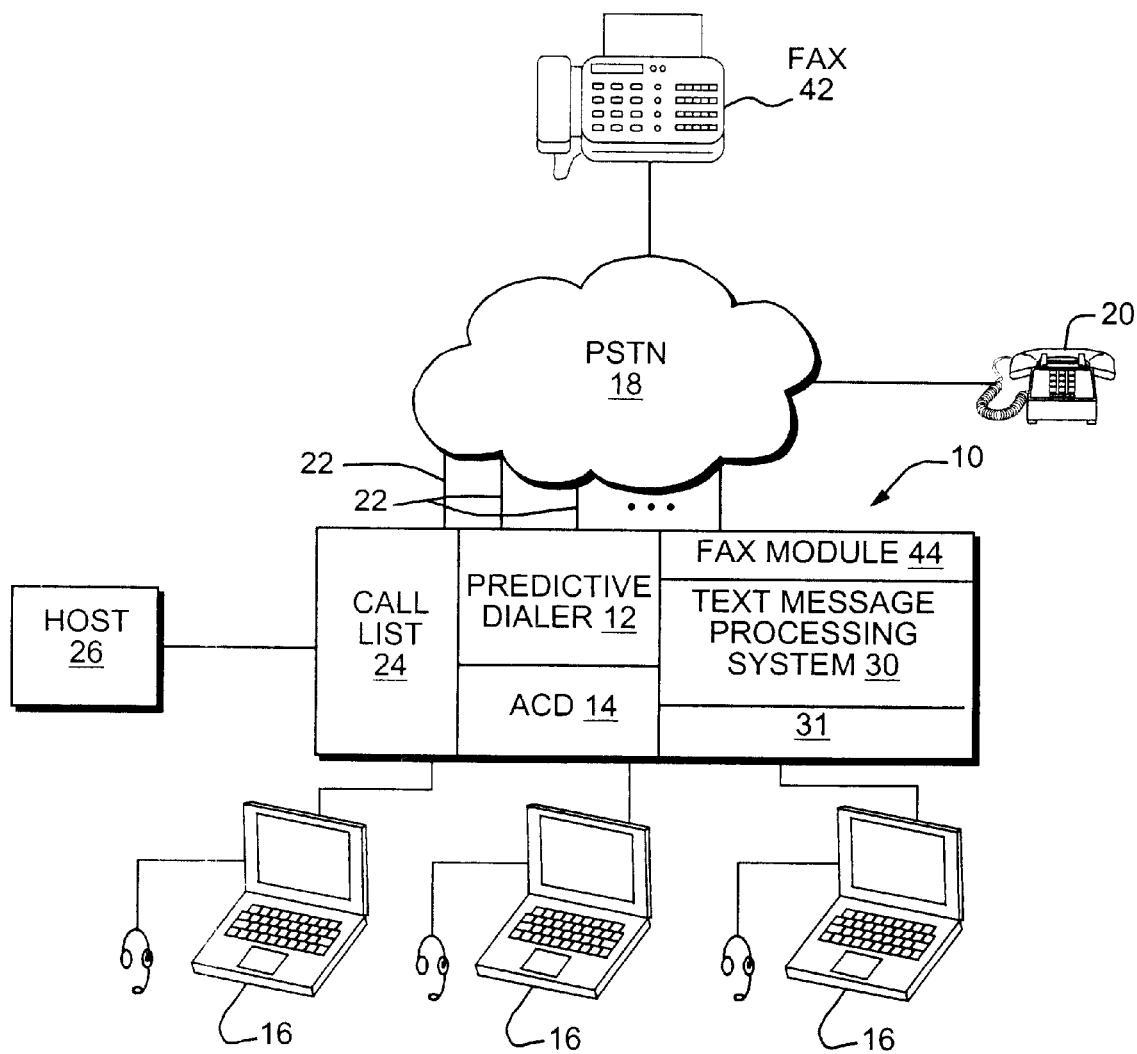
FIG. 2 is a block diagram of a second embodiment of a system for integrating outbound text messaging capabilities to a telephone call center management system according to the present invention wherein the text message is a facsimile message, which is transmitted to a receiving fax machine over the PSTN.

FIG. 2 shows a second embodiment of the present invention. This embodiment includes like components to the embodiment of FIG. 1, which are indicated with like reference numerals. However, instead of forwarding a SMS message to a mobile communication terminal, this embodiment forwards a text message to a customer fax machine 42. The fax message is generated using a fax module 44 included in the text message processing system 30. The fax module 44 converts the text message, which is stored in the text message memory 31 into a facsimile compatible text message.

In a manner similar to that described above, when the call center management system 10 is unable to establish voice communications with a customer 20 and a call center agent 18, the call center management system 10 attempts to establish fax communications by dialing a fax telephone number included in a call record. When a destination fax machine 42 answers the telephone call placed by the call center management system 10, then the text message, which has been converted to a fax message by fax module 44 is transmitted to the customer fax machine 42 over the PSTN 18. Since the facsimile communication standard includes signals which indicate whether or not a fax was received, the call center management system 10 will receive the fax received signal and store the same for later recall should a question arise as to whether the customer received the transmitted text message via fax.

Figure 3:
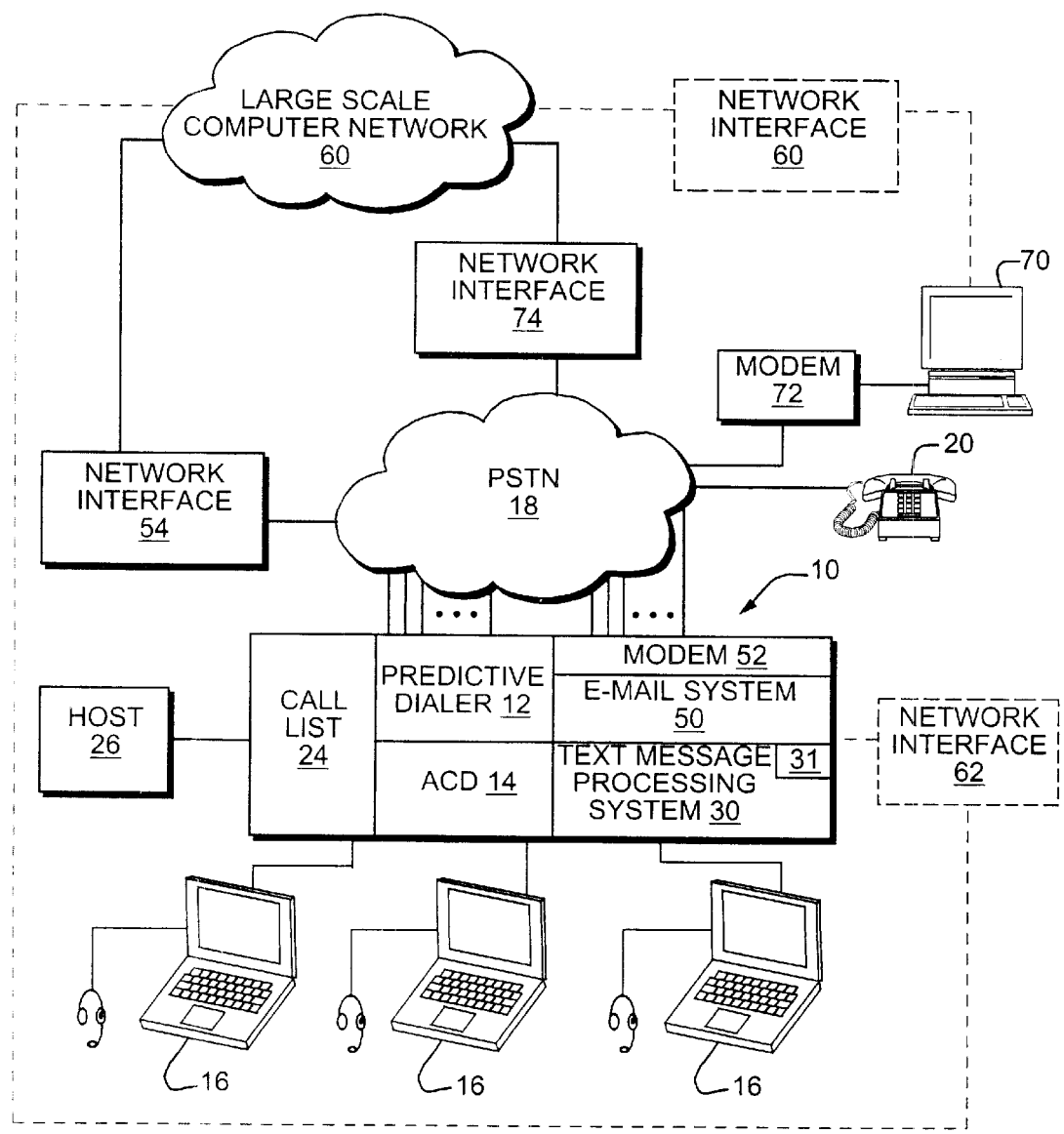
FIG. 3 is a further embodiment of a system for integrating outbound text messaging capabilities to a telephone call center management system according to the present invention wherein the text message is an e-mail message, which is transmitted to a destination e-mail address over a computer network.

FIG. 3 shows a third embodiment of the present invention. In this embodiment, text message processing system 30 includes an e-mail system 50, which converts a text messages stored in the text message memory 31 into an e-mail message, for transmission to an e-mail system included in a customer computer 70.

One manner by which the text message may be transmitted to the customer computer e-mail system 70 is via a large scale computer network 60, such as the Internet. For example, the e-mail system included in the telephone call center management system 10 would transmit an e-mail message via a modem 52 which interfaces with the PSTN 18. The modem 52 would dial a network interface 54, such as an Internet service provider (ISP), which would route the text message over the large scale computer network 60. The customer computer 70 including an e-mail system, may likewise interface the large scale computer network 60 via a modem 72 and a second network interface 74 via the PSTN 18.

Alternatively, the text message processing system 30 may interface directly with the large scale computer network 60 using a direct network interface 62, which would eliminate the requirement of transmitting the message via the PSTN 18. Likewise, the customer computer 70, including the e-mail system may also include a direct network interface 76 for interfacing directly with the large scale computer network 60. In any event, a text message is converted into an e-mail message, which is transmitted to the customer computer e-mail system over one of the transmission routes mentioned above.

Figure 4:
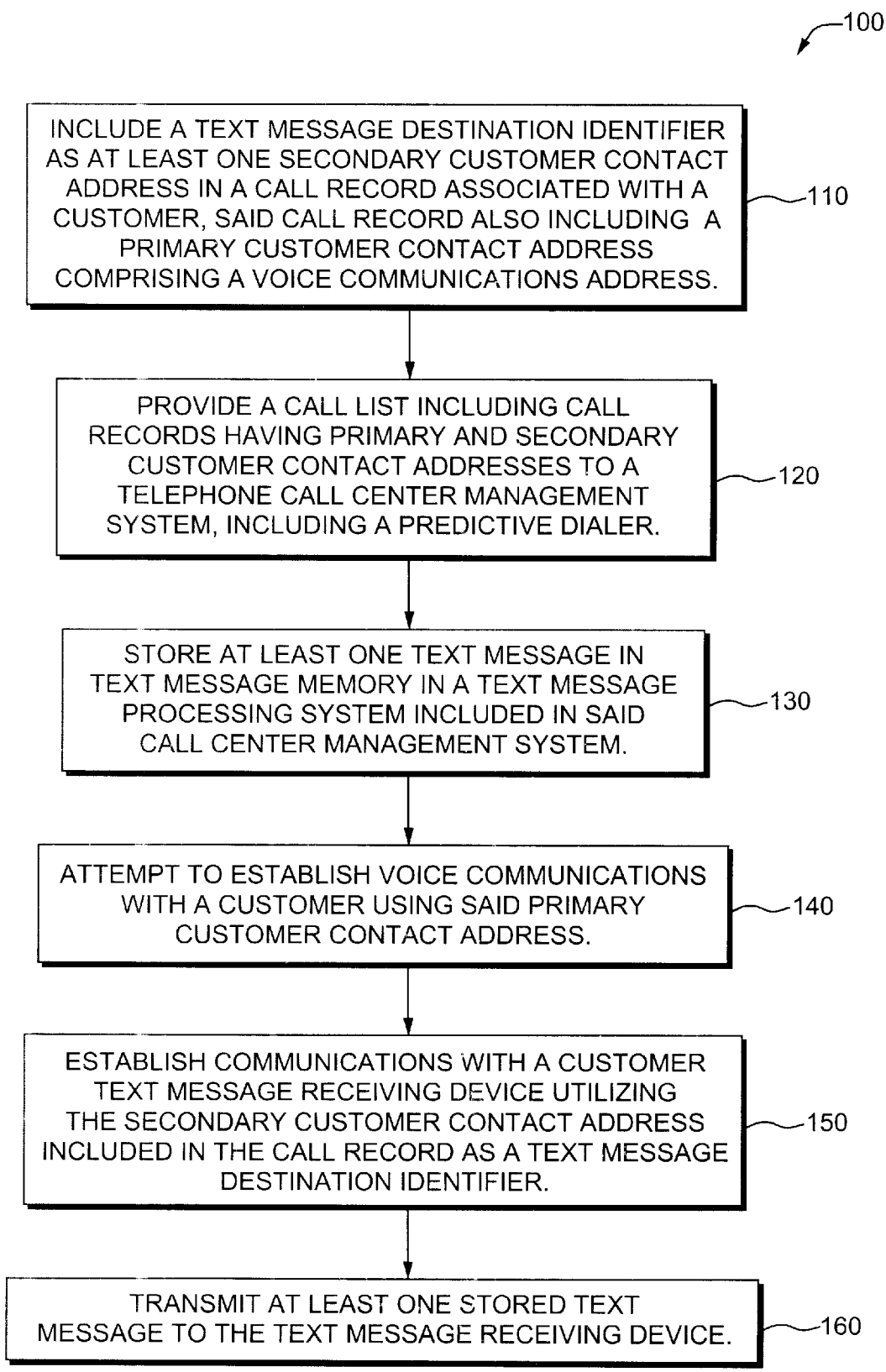
FIG. 4 is a flow chart showing a method of integrating outbound text messaging capabilities to a telephone call center management system according to the present invention.

FIG. 4 provides a flow diagram showing a method 100 of integrating text messaging capabilities to an outbound call campaign. The method begins by including a text message destination identifier associated with a text message receiving device as at least one secondary customer contact address in a call record associated with a customer, step 110. The call record also includes a primary customer contact address, wherein the primary customer contact address comprises a voice communication address, such as a voice line telephone number. Next, a call list, including a plurality of call records including the primary customer contact address and the secondary customer contact address(es) is provided to a telephone call management system including a dialer, step 120. In step 130, at least one text message is stored in text message memory in a text message processing system included in the telephone call management system.

In step 140, the telephone call center management system attempts to establish voice communications with at least one customer by dialing the primary customer contact address included in the call record associated with the customer. Then, if voice communications can not be established with the customer, then the call center management system establishes communications with a customer text message receiving device utilizing the secondary customer contact address included in the customer call record as a text message destination identifier, step 150. Finally, at least one stored text message is transmitted to the text message receiving device, step 160.

Accordingly, the disclosed invention allows a telephone call center to experience increased efficiency and effectiveness by providing an alternate means of contacting a customer should it be impossible to establish voice communications with that customer. The alternate form of communications is via a text message, which is transmitted to a text message receiving device associated with the customer. In one embodiment, the text message comprises a Short Message Service message, which is compatible with GSM mobile communications terminals. Alternatively, the text message may be a fax message or an e-mail message.

Modifications and substitutions by one of ordinary skill in the art are considered to be within the scope of the present invention which is not to be limited except by the claims which follow.

What is claimed is:

1. A system for integrating text messaging to an outbound call system comprising:

a call list including at least one call list record, said at least one call list record including a plurality of customer contact identifiers including at least one primary customer contact identifier comprising a voice communications identifier and at least one secondary customer contact identifier wherein said at least one secondary customer contact identifier comprises a text message destination identifier which accesses a text message receiving device associated with a customer;

a telephone call management system including a dialer, for first dialing one of said at least one primary customer contact identifiers included in said at least one call list record to attempt to make voice communication with a customer, means for determining whether voice communication with said customer has or has not been established, and means for making connection with said text message receiving device utilizing said text message receiver identifier only if said determining means determines that voice communication with said customer has not been established; and a text message processing system, for accepting and storing at least one text message for transmission to said text message receiving device, and for transmitting said at least one text message to said text message receiving device identified by said at least one secondary customer contact identifier included in said at least one call record upon connection with said identified text message receiving device.

2. The text message integration system of claim 1, wherein said text message receiving device comprises a mobile communications device including a short message display.

3. The text message integration system of claim 1, wherein said at least one text message comprises a facsimile message and wherein said text message receiving device comprises a facsimile machine.

4. The text message integration system of claim 1, wherein said at least one text message comprises an electronic mail (e-mail) message and wherein said text message receiving device comprises a computer running an e-mail program, said computer interconnected with said text message processing system over a computer network including at least one telephone line.

* * * * *